US012385528B2

(12) United States Patent
Olsen (10) Patent No.: US 12,385,528 B2
(45) Date of Patent: Aug. 12, 2025

(54) BEARING HOUSING (71) Applicant: NGI A/S, Norresundby (DK)

(72) Inventor: Tomas Hecht Olsen, Klarup (DK)

(73) Assignee: NGI A/S, Norresundby (DK)

( * ) Notice: Subject to any disclaimer, the term of this patent is extended or adjusted under 35 U.S.C. 154(b) by 76 days.

(21) Appl. No.: 17/790,240

(22) PCT Filed: Jan. 28, 2021

(86) PCT No.: PCT/EP2021/051936
§ 371 (c)(1),
(2) Date: Jun. 30, 2022

(87) PCT Pub. No.: WO2021/151983
PCT Pub. Date: Aug. 5, 2021

(65) Prior Publication Data
US 2023/0040152 A1 Feb. 9, 2023

(30) Foreign Application Priority Data

Jan. 30, 2020 (DK) .............................. PA202000112
Dec. 22, 2020 (DK) .............................. PA202001452

(51) Int. Cl.
F16C 35/02 (2006.01)
F16C 35/04 (2006.01)
(52) U.S. Cl.
CPC ............ F16C 35/02 (2013.01); F16C 35/042 (2013.01)
(58) Field of Classification Search
CPC ........ F16C 35/02; F16C 35/04; F16C 35/042; F16C 35/045; F16C 35/047
See application file for complete search history.

(56) References Cited

U.S. PATENT DOCUMENTS

| 2,819,128 A | | 1/1958 | Downs |
| 4,033,641 A | | 7/1977 | Cain et al. |
| 5,129,737 A | | 7/1992 | Stenner |
| 5,328,276 A | * | 7/1994 | Linteau ................... F16C 33/76 384/477 |

(Continued)

FOREIGN PATENT DOCUMENTS

| AU | 491250 B2 | 2/1977 |
| EP | 0579869 A2 | 12/1992 |

(Continued)

OTHER PUBLICATIONS

Translation of EP1503096 obtained Sep. 11, 2024.*

(Continued)

Primary Examiner — James Pilkington
(74) Attorney, Agent, or Firm — Nath, Goldberg & Meyer; Jerald L. Meyer (57) ABSTRACT A bearing housing (1) is constructed with a bearing housing body (2) for receiving a rotating shaft, and two or more bearing housing feet (4) for attaching the bearing housing (1) to a base (10), wherein each of the two or more bearing housing feet (4) extends from the bearing housing body (2) by the means of an arm (6). The bearing housing body (2) has a fixed bearing housing body (2a), a bearing housing cover (2b) and a flat cover (2c), with an opening for inserting the shaft (11). Parts of the bearing housing body (2) form a closed space, and either the bearing housing cover (2v) or the flat cover (2c) is removable.

16 Claims, 3 Drawing Sheets (56) References Cited

U.S. PATENT DOCUMENTS

| | | | |
|---|---|---|---|
| 5,927,864 A | 7/1999 | Feerick | |
| 9,555,976 B2 * | 1/2017 | Eure | F16C 43/00 |
| D998,007 S * | 9/2023 | Olsen et al. | |
| 2019/0032719 A1 | 1/2019 | Creek et al. | |

FOREIGN PATENT DOCUMENTS

| | | | |
|---|---|---|---|
| EP | 1503096 A2 * | 2/2005 | F16C 27/066 |
| GB | 2250788 A | 6/1992 | |

OTHER PUBLICATIONS

Danish Search Report dated Aug. 18, 2020 corresponding to application No. PA 2020 00112.
International Search Report dated Jun. 5, 2021 corresponding to application No. PCT/EP2021/051936.

* cited by examiner

BEARING HOUSING

This is a National Phase Application filed under 35 U.S.C. 371 as a national stage of PCT/EP2021/051936, filed Jan. 28, 2021, an application claiming the benefit of Denmark Application No. PA202000112, filed Jan. 30, 2020, and Denmark Application No. PA202001452, filed Dec. 22, 2020, the content of each of which is hereby incorporated by reference in its entirety.

TECHNICAL FIELD

The present invention relates to a bearing housing for use in environments where the environmental hygiene is highly prioritised. In particular the present invention relates to a bearing housing for use in environments where the environmental hygiene is highly prioritised in order to limit or even avoid deposit or accumulation of dirt, grime, microbial material, or allergens, on, inside or around the bearing housing.

BACKGROUND

For the last decade, the food and beverage industry has seen a significant increase in products that needs to be recalled because of contamination of microorganisms, allergens or dirt that are not intended to be present in the food product.

In this respect bacterial contamination and undeclared allergens together represent about 75% of the top FDA food recall causes based on units.

Many companies provide strict guidelines and measures on safety practice in the production zones to protect the food products. These might include measures such as posted signs encouraging hand-washing or purchasing hygienically designed "food grade" machines.

Due to the increasing number of recalls proactive food safety has become the foremost concern for food and beverage executives and different approached are used to reduce or avoid the contaminated food product.

One approach is the control of food products and production lines which is highly undesirable for the manufacture as inspection is time consuming and costly. Results of the inspection may lead to closure of the process line until the devices and equipment have been properly cleaned. This clearly has a strong impact on the turnover of the manufacturer in respect of down time, and no product production.

Thus, the alternative approach is to ensure proper cleaning of the devices and equipment to ensure a clean and un-contaminated environment and to ensure the food safety is in top.

One of the risk zones for contamination with dirt, microorganisms and allergens and that has shown to be difficult to clean properly is the bearing housings and around the bearing housings. The problem often lies in:
- the lubrication of bearings where excess lubricant may offer a safe place for contamination to hide and accumulate;
- the wash-down during cleaning may be difficult due to the design of the bearing housing where dirt, microorganisms and allergens may hide and accumulate in various spots around the bearing housing (e.g. in certain angles, difficult approachable surfaces, or hidden surfaces);
- the wash-down during cleaning may be also be difficult due to the gaps or joints that occurs in the prior art bearing housings when the individual parts of the bearing housing are joined, or in gaps or joints where the prior art bearing housings are attached to the base of the device or equipment. These gaps or joints (together with other pits; folds; cracks; crevices; or other imperfections of the bearing housing) offer a safe place for dirt, microorganisms and allergens to hide and accumulate which may be difficult to reach during cleaning.

Hence, an improved bearing housing would be advantageous, and in particular a bearing housing which make wash-down and cleaning more efficient and/or more reliable resulting in a limitation or even to avoid deposit or accumulation of dirt, grime, microbial material, or allergens, on, in or around the bearing housing would be advantageous.

SUMMARY OF THE INVENTION

Thus, an object of the present invention relates to a bearing housing for use in environments where the environmental hygiene is highly prioritised.

In particular, it is an object of the present invention to provide a bearing housing which make wash-down and cleaning more efficient and/or more reliable and that solves the above mentioned problems of the prior art with deposit or accumulation of dirt, grime, microbial material, or allergens, on, in or around the bearing housing.

Thus, one aspect of the invention relates to a bearing housing (1) comprising a bearing housing body (2) for receiving a rotating shaft, and two or more bearing housing feet (4) for attaching the bearing housing (1) to a base, wherein each of the two or more bearing housing feet (4) extends from the bearing housing body (2) by the means of an arm (6).

Another aspect of the present invention relates to the use of the bearing housing (1) according to the present invention, for use in environments with high hygienic requirements, high cleaning requirements and/or environments where low (or no) deposit or accumulation of dirt, grime, microbial material and/or allergens is accepted.

A further aspect of the present invention relates to the use of the bearing housing (1) according to the present invention, for use in a hygienic environment.

Yet another aspect of the present invention relates to the use of the bearing housing (1) according to the present invention for use in food production industry, feed production industry, and/or pharmaceutical industry.

DETAILED DESCRIPTION OF THE INVENTION

The present invention will now be described in more detail in the following.

FIG. 1 shows the backside of 4 different variations of a hygienic bearing housing (1) according to the present invention defined by FIG. 1a, FIG. 1b, FIG. 1c, and FIG. 1d. The bearing housing (1) comprises a bearing housing body (2) for receiving a rotating shaft (not shown in FIG. 1), and two or more bearing housing feet (4) for attaching the bearing housing (1) to a base. Each of the two or more bearing housing feet (4) extends from the bearing housing body (2) by the means of an arm (6).

Figure 1A:
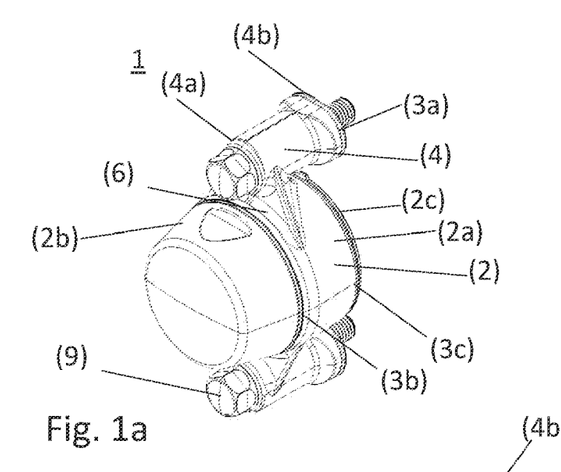
FIGS. 1a, 1b, 1c and 1d show perspective back views of respectively a first, a second a third and a fourth embodiment of bearing housings according to the invention.
Figure 1B:
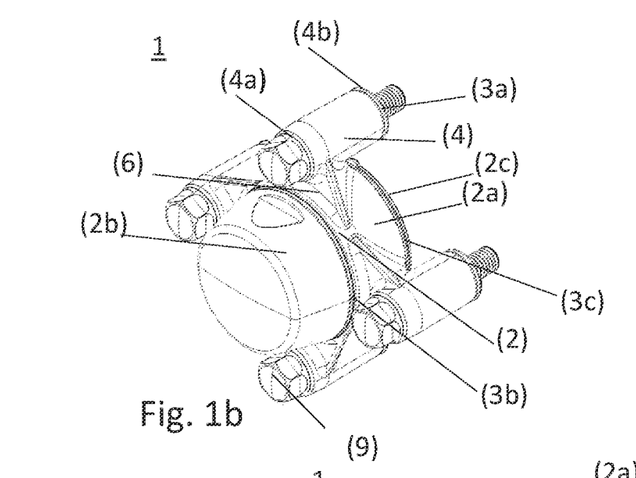
Figure 1C:
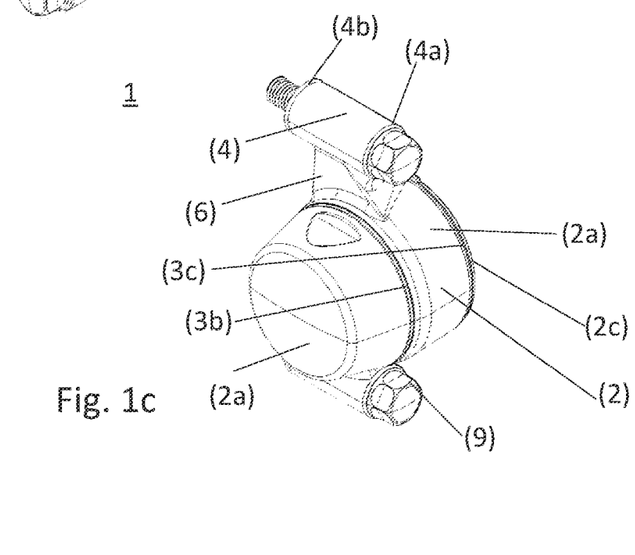
Figure 1D:
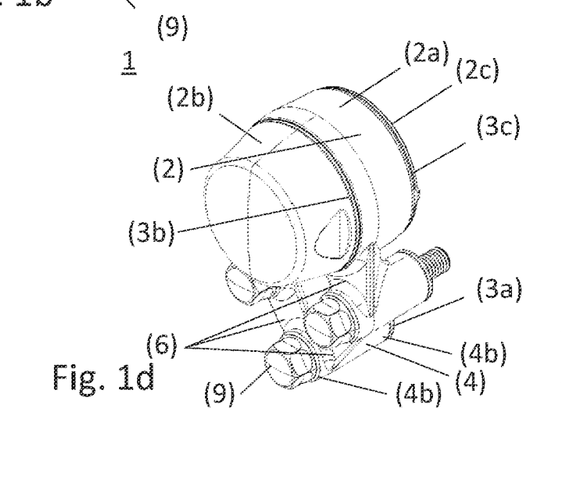

FIG. 1a shows a bearing housing (1) comprising two bearing housing feet (4). The two bearing housing feet (4) are orientated in the longitudinal direction relative to the direction of a rotating shaft to be inserted into the bearing housing (1). FIG. 1b shows a bearing housing (1) comprising 4 bearing housing feet (4). The 4 bearing housing feet (4) are orientated in the longitudinal direction relative to the direction of a rotating shaft to be inserted into the bearing housing (1). FIG. 1c shows a bearing housing (1) comprising two bearing housing feet (4). The two bearing housing feet (4) are orientated in the perpendicular direction relative to the direction of a rotating shaft to be inserted into the bearing housing (1). FIG. 1d shows a bearing housing (1) comprising three bearing housing feet (4). The three bearing housing feet (4) are orientated in the longitudinal direction relative to the direction of a rotating shaft to be inserted into the bearing housing (1).

FIGS. 1a, 1b, and 1c show bearing housing feet (4) that are symmetrically distributed around the bearing housing base (2). FIG. 1d shows a bearing housing (1) comprising three bearing housing feet (4) where the three bearing housing feet (4) are asymmetrically distributed around the bearing housing base (2) and one bearing housing foot (4) is to attached to the bearing housing body (2) via one or more other bearing housing foot (4). Preferably a circular connection of bearing housing feet (4) may be provided, see FIG. 1d.

It is shown in the FIG. 1 that the bearing housing feet (4) has a length which is larger (determined from the top of the bearing feet (4a) to the base end of the bearing feet (4b)) than the hight of the arm (6). Actually, the bearing housing feet (4) are the only parts of the bearing housing which is in contact with the base when the bearing housing (1) is attached to the base. As the bearing housing base (2) and the arm (6) are not in contact with the base when attached to the base the open space created between the bearing housing body (2) (and the arm (6)) and the base (when attached to the base) allows for easy access for cleaning the bearing housing from all angles.

The bearing housing body (2) comprises a fixed bearing housing body (2a) connected, via the arm (6), with the two bearing housing feet (4) (FIGS. 1a and 1c), the three bearing housing feet (4) (FIG. 1d), or the 4 bearing housing feet (4) (FIG. 1b), and a removable bearing housing cover (2b) which is attached to the fixed bearing housing body (2a). On the opposite site of the fixed bearing housing body (2a) and relative to the removable bearing housing cover (2b) of, a removable flat cover (2c) is provided. The removable flat cover (2c) comprises a shaft insertion (not shown).

Between the fixed bearing housing body (2a) and the removable flat cover (2c) and between the fixed bearing housing body and the removable bearing housing cover (2b) a seal (3c and 3b respectively) is inserted to ensure that water does not enter the bearing housing (1) in these joints. The sealings (3) are configured with contours which are adapted to the structure of the surfaces connected or elements connected and thereby substantially ensure a continuous or substantially continuous surface in the joints between surfaces or elements connected, resulting in that dirt, grime, microbial material (such as bacteria or fungus), or other fouling materials (e.g. allergens), may be hindered or prevented from hiding and/or accumulating.

A seal (3a) is also provided in the base end of each of the bearing housing feet (4b) to avoid accumulation of dirt, grime, microbial material, or other fouling materials in the joint between the bearing housing body (2) and the base.

The seals (3) is prepared from a non-conductive soft silicone material. With a blue color, RAL 5010, which provides an improved visual inspection of the hygienic level and/or cleaning quality.

The sealings (3) according to the present invention assist in providing a bearing housing being waterproof by blocking entering of water, dirt and microbial activity.

The bearing housing feet (4) comprises attachment means (9), such as bolts and nuts for attaching the bearing housing (1) to the base.

The bearing housing (1) is made of a sturdy polypropylene material and the surface of the bearing housing (1) is made smooth to allow drainage of water from the surface. The surface of the bearing housing (1) has a roughness below Ra 2.0 μm; such as Ra 1.8 μm; e.g. Ra 1.6 μm; such as Ra 1.4 μm; e.g. Ra 1.2 μm; such as Ra 1.0 μm; e.g. Ra 0.8 μm; such as Ra 0.6 μm; e.g. Ra 0.4 μm.

Inside the bearing housing (1) a bearing suitable for receiving a rotating shaft is installed. The bearing may be a ceramic bearing or a stainless-steel bearing.

Figure 2:
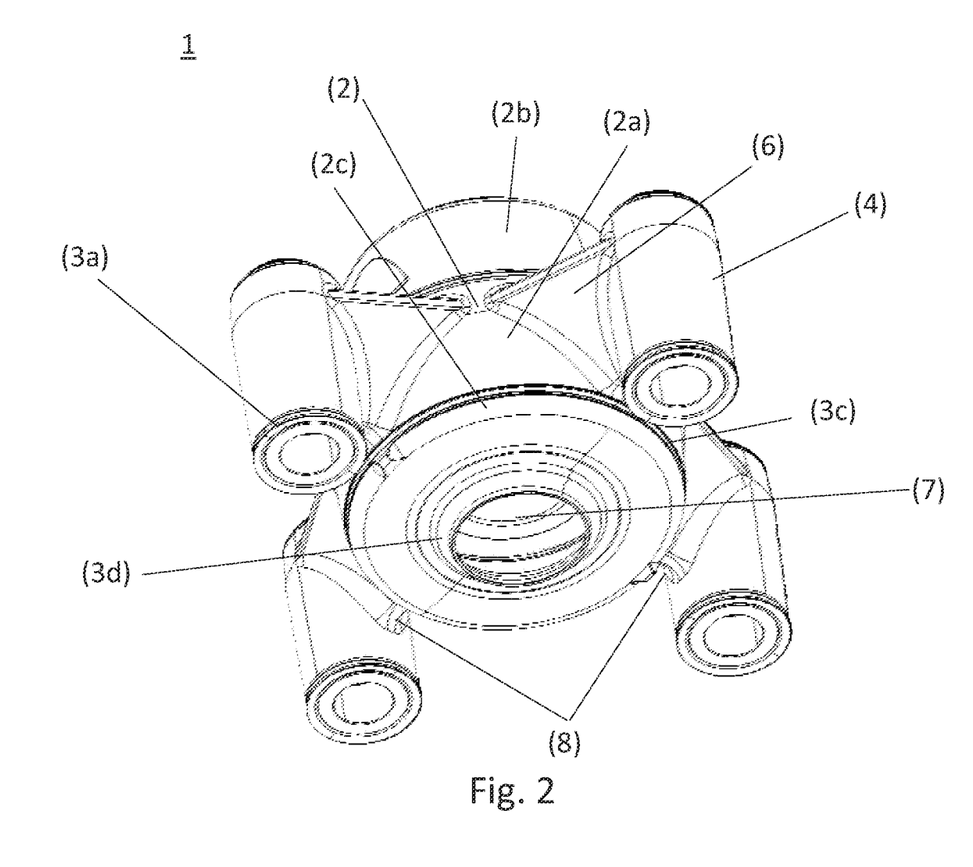
FIG. 2 show a perspective front view of the second embodiment.

FIG. 2 shows the front side of a hygienic bearing housing (1) according to the present invention. The bearing housing (1) comprises a bearing housing body (2) for receiving a rotating shaft (not shown), and 4 bearing housing feet (4) for attaching the bearing housing (1) to a base. Each of the two or more bearing housing feet (4) extends from the bearing housing body (2) by the means of a arm (6).

At the base end of the bearing feet (4b), which are the only parts of the bearing housing which is in contact with the base when the bearing housing (1) is attached to the base a sealing (3a) is provided.

The bearing housing body (2) comprises:
  a fixed bearing housing body (2a) connected, via the arm (6), with two bearing housing feet (4); and
  a removable flat cover (2c) comprising a shaft insertion (7).

Inside the bearing housing base (2) a bearing is installed to suitable for receiving a rotating shaft, and a sealing (3d) is provided which may be in contact with the shaft when the shaft is inserted into the bearing housing body (2).

In an embodiment of the present invention the sealing (3d) may be formed with a spherical structure. Preferably, the spherical structure of the sealing (3d) has the same, or substantially the same radius as the spherical structure of the outer rim of a bearing inserted into the bearing housing (1). The spherical structure of the outer rim may be determined in the longitudinal direction of the shaft when inserted into the bearing housing (1).

The arm (6) is formed as a polyhedron, in particular as a triangular prism. The first end of the two triangular ends is attached to the bearing housing body (2) and the second end of the two triangular parts is attached to one of the two bearing housing feet (4). The first triangular end has a curative end having a radius relative to the radius of the bearing housing body (2) which is larger than the radius of the curative end attached to each of the two bearing housing feet (4).

The arm (6) has a length (1) determining how far each of the two bearing housing feet (4) extends from the bearing housing body (2); a hight (h) determined in the direction from the bearing housing (1) to the base and a width (w) determined in the direction perpendicular to the direction from the bearing housing (1) to the base.

The arm (6) is formed as an integrated part of the fixed bearing housing body (2a) and the two bearing housing feet (4) during moulding.

The arm (6) is not in contact with the base when the bearing housing (1) is attached to the base.

The tip (8) of the arm (6) which is formed as a polyhedron, in particular as a triangular prism, is pointing towards the base. This structure of the arm (6) improves cleaning around the bearing housing with improved access for cleaning from all sides and angles of the bearing housing, and improved drainage of water.

Figure 3:
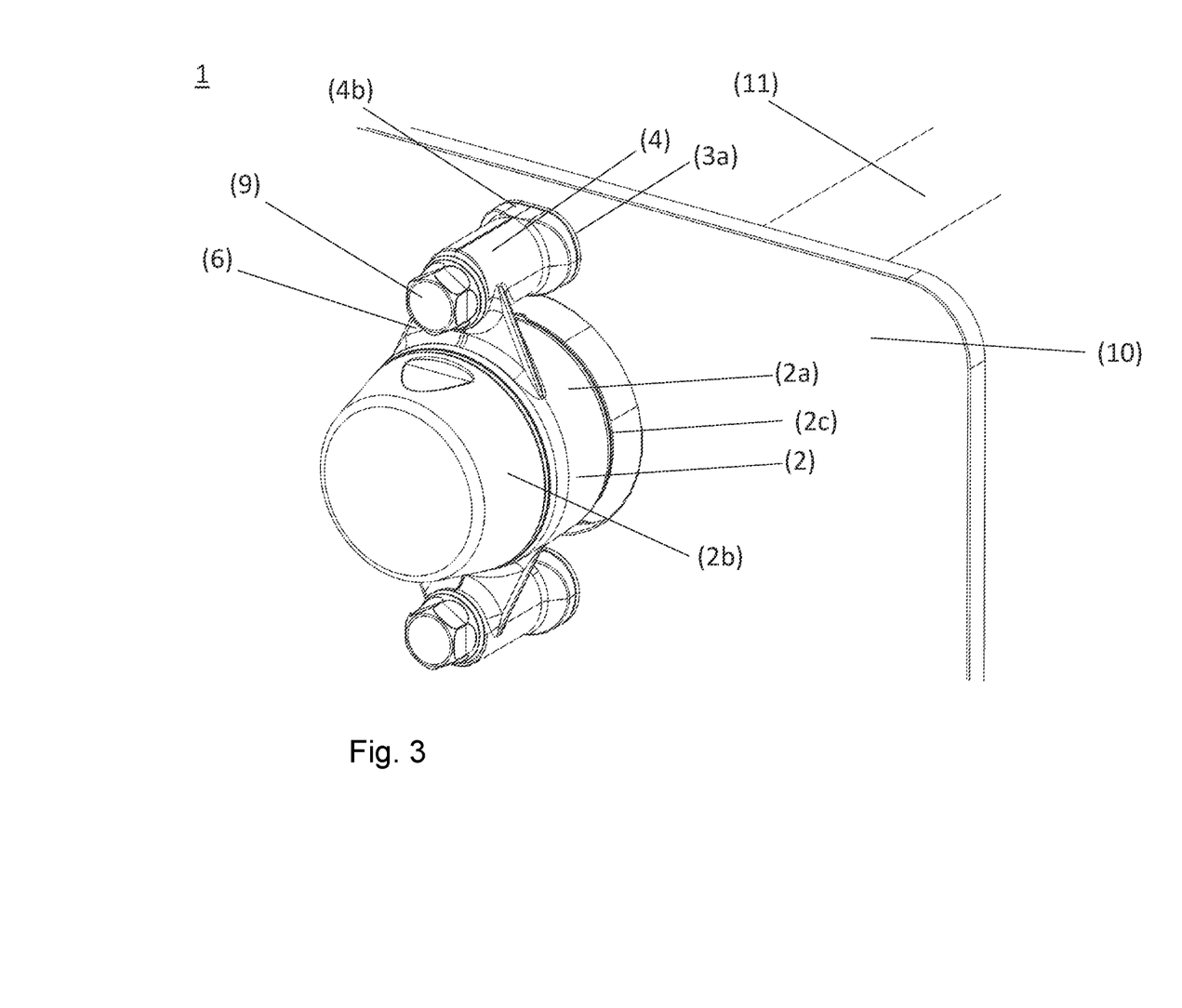
FIG. 3 shows a perspective front view of the first embodiment mounted on a base .3

FIG. 3 shows a hygienic bearing housing (1) according to the present invention. The bearing housing (1) comprises a bearing housing body (2) for receiving a rotating shaft (11), and 4 bearing housing feet (4) for attaching the bearing housing (1) to a base. Each of the two or more bearing housing feet (4) extends from the bearing housing body (2) by the means of an arm (6).

The bearing housing body (2) comprises a fixed bearing housing body (2a), a removable bearing housing cover (2b); and a removable flat cover (2c) comprising a shaft insertion for inserting the shaft (11).

The bearing housing (1) according to the present invention is attached using attachment means (9), such as bolts, to a base (10) at the base end of the bearing feet (4b), which are the only parts of the bearing housing which is in contact with the base (10) when the bearing housing (1) is attached to the base a sealing (3a) is provided.

The bearing housing body (2) comprises:
a fixed bearing housing body (2a) connected, via the arm (6), with two bearing housing feet (4); and
a removable flat cover (2c) comprising a shaft insertion.

Bearing housings are often one of the places in a hygienic environment, such as a food production site or a pharmaceutical site, where dirt, grime, microbial material (such as bacteria or fungus), or other fouling materials, such as allergens, may hide and accumulate resulting in contaminated products with undesirable components. Accordingly, the inventors of the present invention surprisingly found that simplifying and rebuilding the bearing housing, cleaning in, on and around the bearing housing may be much easier and the incidence of deposits or accumulation of dirt, grime, microbial material, or allergens, on, in or around the bearing housing, may be significantly reduced or even avoided, and at the same time without compromising strength, robustness or stability of the bearing housing.

Thus, a preferred embodiment of the present invention relates to a bearing housing comprising a bearing housing body for receiving a rotating shaft, and two or more bearing housing feet for attaching the bearing housing to a base, wherein each of the two or more bearing housing feet extends from the bearing housing body by the means of an arm.

In the context of the present invention the term "attaching" relates to the fixation of one element to another element. In an embodiment of the present invention the term "attaching the bearing housing to a base" relates to the fixation of the bearing housing to the base making it immobile or substantially immobile.

The bearing housing may be provided to support the bearings provided for receiving the rotating shaft. The bearing housing may also protect the bearings from contaminants while keeping the lubricant inside the bearing housing.

The bearing housing may be mounted in a vertical position or in a horizontal position to the base, depending on the application and/or the location of the bearing housing.

One of the unique features of the bearing housing according to the present invention may be the projection of the two or more bearing housing feet next to the bearing housing body by introducing an arm between each of the two or more bearing housing feet and the bearing housing body. In the present context the term "extend from" relates to stretching out two or more bearing housing feet from the bearing housing body. Preferably, the two or more bearing housing feet are extended from or stretched out from the bearing housing and separated by an arm.

In an embodiment of the present invention the arm may be used for extending the bearing housing feet from the bearing housing body and between two or more bearing housing feet. If three or more bearing housing feet are connected to each other, one or more bearing housing feet may be attached to the bearing housing body via another bearing housing foot.

In the present context the term "arm" relates to a piece of material used to create or maintain a space between two elements, in particular between each of the two or more bearing housing feet and the bearing housing body and/or between individual bearing housing feet. The arm according to the present invention may be constructed to improve and/or ease cleaning in, on or around the bearing housing and at the same time to provide strength and stability to the bearing housing.

In an embodiment of the present invention, the arm may preferably provide a distance between the centre of the bearing housing and the attachment means by at least 4 mm; such as at least 5 mm; e.g. at least 6 mm; such as at least 7 mm; e.g. at least 8 mm; such as in the range of 4-15 mm; e.g. in the range of 5-12 mm; such as in the range of 6-8 mm.

The term "a distance between the centre of the bearing housing" may be determined as the centre of the cross sectional area of the bearing housing perpendicular to the longitudinal direction of the rotating shaft when inserted into the bearing housing.

In an embodiment of the present invention the arm may be made of the same material as the material used in the two or more bearing housing feet and/or in the bearing housing body.

In another embodiment of the present invention the arm may be made of a different material than the material used in the two or more bearing housing feet and/or in the bearing housing body.

In an embodiment of the present invention the bearing housing comprise 3 or more bearing housing feet each extending from the bearing housing body by the means of an arm, such as 4 or more bearing housing feet, e.g. 5 or more bearing housing feet, such as 6 or more bearing housing feet, e.g. 8 or more bearing housing feet. In a preferred embodiment of the present invention the bearing housing comprises 2-4 bearing housing feet, which each extending from the bearing housing body by the means of an arm.

In a further embodiment of the present invention the bearing housing feet may involve a flange.

The bearing housing feet or the flange may be fitted with attachment means. The attachment means may include nuts and bolts where the bolt is going through the bearing housing feet or the flange, preferably in longitudinal direction relative to the direction of the bearing housing feet or the flange, and through the base.

In an embodiment of the present invention each of the two or more bearing housing feet may comprises attachment means for attaching the bearing housing to the base.

In a further embodiment of the present invention the base may be a part of a machine, a device, an equipment, or the like.

The inventors of the present invention surprisingly found that by reducing the amount of material being in contact with the base, areas or spots available for dirt, grime, microbial material and/or other fouling materials to hide and accumulate may be significantly reduced and/or by reconstructing the bearing housing it has become easier to clean in, on and around the bearing housing with easy access for cleaning from all angles around the bearing housing. This improved construction surprisingly makes wash-down and cleaning more efficient and/or more reliable resulting in the above-mentioned reductions.

In an embodiment of the present invention the two or more bearing housing feet may be the only part of the bearing housing which is in contact with the base.

In a further embodiment of the present invention the bearing housing body and/or the arm is/are not in contact with the base.

In this situation, where the two or more bearing housing feet may be the only part of the bearing housing which is in contact with the base and/or where the bearing housing body and/or the arm is/are not in contact with the base, an open space is left between the part of the bearing housing not in contact with the base (e.g. the bearing housing body and/or the arm) and the base. Preferably, the open space between the bearing housing body and the base, and/or the open space between the arm and the base, is more than 1 mm, such as more than 3 mm, e.g. more than 5 mm, such as more than 1 cm, e.g. more than 1.5 mm, such as more than 2.5 mm, such as in the range of 0.1-5 cm; e.g. in the range of 0.2-3 cm; such as in the range of 0.3-3 cm; e.g. in the range of 0.5-2.75 cm; such as in the range of 0.75-2.54 cm.

In an embodiment of the present invention the length of the two or more bearing housing feet is in the direction substantially longitudinal to the opening for receiving the rotating shaft.

In a further embodiment of the present invention the length of the two or more bearing housing feet is in the direction substantially perpendicular to the direction of the base where the bearing housing is mounted.

In an embodiment of the present invention the two or more bearing housing feet may be further extended to make an additional distance between the bearing housing body and the base. The further extension of the two or more bearing housing feet may be provided by introducing feet-spacers to each of the two or more bearing housing feet until the desired length has been reached. Preferably, a seal is placed between each of the feet-spacers and each of the two or more bearing housing feet. Preferably, a seal is placed between each of the feet-spacers and the base.

Misalignment, hence substantially perpendicular and/or substantially longitudinal of bearing housings may be subjected to some deviation between 0-20° are considered to be within the range of substantially longitudinal direction, or within the range of substantially perpendicular, to allow some mis alignment without compromising the hygiene safety, strength or stability; such as between 1°-15°, e.g. between 1.5°-10°, such as between 2°-5°, e.g. about 3°.

The inventors of the present invention have found that by reducing the amount of material used when constructing the bearing housing cleaning around the bearing housing and cleaning from various angles around the bearing housing was much easier and significantly more efficient and/or more reliable resulting in a limitation or even avoiding deposit or accumulation of dirt, grime, microbial material, or allergens, on, in or around the bearing housing would be advantageous.

The inventors of the present invention surprisingly found that in particular the amount of material use for constructing the part between the bearing housing body and the two or more bearing housing feet may be reduced. The inventors of the present invention surprisingly found that by replacing this part of the bearing housing (the part between the bearing housing body and each of the two or more bearing housing feet) may be replaced with an arm according to the present invention without compromising the strength, robustness or stability of the bearing housing.

The arm according to the present invention may have:
- a length (1) determining how far each of the two or more bearing housing feet extend from the bearing housing body. Preferably, each of the arms may have the same length (1);
- a hight (h) determined in the direction from the bearing housing to the base. Preferably, each of the arms may have the same hight (h);
- a width (w) determined in the direction perpendicular to the direction from the bearing housing to the base. Preferably, each of the arms may have the same hight (h).

In an embodiment of the present invention the two or more bearing housing feet has a length which is larger (determined from the top of the bearing feet to the base) than the hight of the arm.

By constructing the bearing housing with the two or more bearing housing feet having a length which is larger than the hight of the arm an open space may be provided between the arm and the base. This open space may improve and ease cleaning in, on and around the bearing housing and also easier cleaning from various angles of the bearing housing, bearing housing body, the fixed bearing housing body, and/or the two or more bearing housing feet.

In an embodiment of the present invention the arm may be placed relative to the base and/or the two or more bearing housing feet to provide an open space between the arm and the base.

Preferably, the open space between the arm and the base is more than 1 mm, such as more than 3 mm, e.g. more than 5 mm, such as more than 1 cm, e.g. more than 1.5 mm, such as more than 2.5 mm; such as in the range of 0.1-5 cm; e.g. in the range of 0.2-3 cm; such as in the range of 0.3-3 cm; e.g. in the range of 0.5-2.75 cm; such as in the range of 0.75-2.54 cm.

In an embodiment of the present invention the width of two or more bearing housing feet (4) is equal to or smaller than the width of the two or more bearing housing feet (4).

The construction according to the present invention, relative to prior art construction of bearing housings, may involve removal of material around the two or more bearing housing feet and/or removal of material between the two or more bearing housing feet and the bearing housing body and the individual elements (such as the two or more bearing housing feet; the bearing housing body; and/or the arm, may be easily differentiated.

In an embodiment of the present invention the arm may be easily distinct from the two or more bearing housing feet.

In a further embodiment of the present invention the arm may be easily distinct from the bearing housing body.

In an even further embodiment of the present invention the two or more bearing housing feet may be easily distinct from the bearing housing body In the present context the term "easily distinct" relates to a clear difference between the elements of the bearing housing, such as a difference between the bearing housing body and the two or more bearing housing feet; between the two or more bearing housing feet and the arm; and/or between the bearing housing body and the arm). In an embodiment of the present invention the difference may be a visual differentiation.

In an embodiment of the present invention the fixed bearing housing body, the arm and the two or more bearing housing feet may be produced, e.g. by moulding, preferably moulded in one piece.

As mentioned above the construction, the design and/or the fabrication of the arm may assist in improving the cleaning and the arm according to the present invention may improve drainage, such as being able to self-drain liquids, such as aqueous suspension, e.g. an aqueous cleaning solution. By making cleaning easier and more effective, and by introducing easy draining, or even self-draining surfaces of the bearing housing, and in particular the arm, the incidence and/or risk of hiding or accumulation of dirt, microbial material or other contaminating material may be reduced or even avoided.

In an embodiment of the present invention the arm may be formed as a polyhedron, such as a triangular prism; a square prism; a pentagonal prism; or a hexagonal prism. Preferably, the arm may be formed as a triangular prism.

In another embodiment of the present invention the polyhedron may be a frustum. In the context of the present invention the term "frustum" relates to a structure topologically identical to a prism, with trapezoid lateral faces and different sized top and bottom polygons.

In an embodiment of the present invention the arm comprises a first curvature end aligned with the radius of the bearing housing body and a second curvature end aligned with the radius of the bearing housing feet. Preferably, the radius of the first curvature end is larger than the radius of the second curvature end.

In an embodiment of the present invention the term "curvature end" relates to an end that has aligned and adapted to the surface that the end is attached.

The triangular prism may comprise three rectangular parts and two triangular ends, preferably the two triangular ends have dissimilar dimensions. In an embodiment of the present invention the triangular end being connected to the bearing housing has a radius which is larger than the radius of the triangular end being connection to one of the two or more bearing housing feet.

In an embodiment of the present invention the first end of the two triangular ends may be attached to the bearing housing body and the second end of the two triangular parts may be attached to one of the two or more bearing housing feet.

The arm may take different forms depending and shapes and at least one edge of the polyhedron, e.g. of the triangular prism, may be straight shaped, concave shaped or convex shaped.

The at least one edge of the polyhedron, e.g. of the triangular prism, is concave shaped and at least one length of the edge of the triangular prism is convex shaped.

In an embodiment of the present invention a tip of the polyhedron, e.g. of the triangular prism, may be pointing towards the base.

In an embodiment of the present invention the term "tip of the polyhedron" relates to one of the edges of the polyhedron, e.g. the triangular prism. Preferably, the one of the edges of the polyhedron, e.g. the triangular prism, is pointing toward the base, preferably directly towards the base.

By the above-mentioned structure of the bearing housing a limited amount of the bearing housing is in contact with the base and/or a larger open space around the bearing housing may be provided allowing an easier and more efficient and/or more reliable cleaning resulting in a limitation or even to avoid deposit or accumulation of dirt, grime, microbial material, or allergens, on, in or around the bearing housing.

For improving maintenance of the bearing housing, the bearing inside the bearing housing during use and/or for ease installation of a beating and/or a shaft in the bearing housing the bearing housing body may be provided in different elements which may be joint forming the bearing housing body.

In an embodiment of the present invention the bearing housing body may comprise a fixed bearing housing body and a removable bearing housing cover attached to the fixed bearing housing body. The fixed bearing housing may preferably be connected to the two or more bearing housing feet via the arm according to the present invention.

In a further embodiment of the present invention the bearing housing body may comprise a fixed bearing housing body and a removable flat cover comprising a shaft insertion. The fixed bearing housing may preferably be connected to the two or more bearing housing feet via the arm according to the present invention.

In yet an embodiment of the present invention the bearing housing body may comprise a fixed bearing housing body and a removable bearing housing cover attached to the fixed bearing housing body and a removable flat cover comprising a shaft insertion. The fixed bearing housing may preferably be connected to the two or more bearing housing feet via the arm according to the present invention.

The removable flat cover may be attached to the fixed bearing housing body, on the opposite side of the fixed bearing housing body relative to the removable bearing housing cover.

In the event the bearing housing may be provided with a fixed bearing housing body and a flat cover, a seal may be provided between the fixed bearing housing body and the flat cover.

In the event the bearing housing may be provided with a fixed bearing housing body and a removable bearing housing cover a seal may be provided between the fixed bearing housing body and the removable bearing housing cover.

In an embodiment of the present invention the fixed bearing housing body may comprise a symmetrical structure. In the present context the term "symmetrical structure" relates to a design of the fixed bearing housing body and where the removable bearing housing cover and the removable flat cover may be attached. The symmetrical structure allows attachment of the removable bearing housing cover and the removable flat cover on either side of the fixed bearing housing body. This allows the bearing housing to be attached on both sides of a base depending on the construction to which the bearing housing is to be attached and may depend on e.g. space available for the bearing housing; cleaning possibilities; and/or functionality.

In an embodiment of the present invention the seal/sealings according to the present invention may preferably be configured with contours which are adapted to the structure of the surfaces connected or elements connected and thereby substantially ensure a continuous or substantially continuous surface in the joints between surfaces or elements connected, such as the joints between the fixed bearing housing body and the removable bearing housing cover; and/or the joints between the two or more bearing housing feet and the base and/or the joint between the fixed bearing housing body and the flat cover. By means of the seal/sealings according to the present invention, dirt, grime, microbial material (such as bacteria or fungus), or other fouling materials, such as allergens, may be hindered or prevented from entering the gaps or joints between connecting surfaces or elements.

The seal or sealings according to the present invention may be prepared from a non-conductive material. The seal, sealings or conductive material may be silicone. Preferably, the seal or sealings may be prepared from soft silicone. Preferably, the seal has a blue color, preferably RAL 5010, which provides an improved visual inspection of the hygienic level and/or cleaning quality.

In an embodiment of the present invention the seal comprises a polymer material, preferably the seal comprises essentially a polymeric material.

In an embodiment of the present invention the seal (3d) may be a slide bearing.

The seal according to the present invention may preferably be provided in a one-piece material.

In an embodiment of the present invention the polymeric material may comprise an organic compound. The organic compound may comprise an inert organic compound.

Preferably the polymer material comprises an olefin compound. The olefin compound may be formed like a fiber compound. Preferably the olefin compound may comprise polypropylene, polyethylene or a combination of polypropylene and polyethylene.

Preferably the seal comprises at least 10% organic compound; such as at least 20%; e.g. at least 30%; such as at least 40%; e.g. at least 50%; such as at least 75%; e.g. at least 80%; such as at least 90%; e.g. at least 95%.

The seal comprises less than 30% non-organic material; such as less than 20%; e.g. less than 10%; such as less than 5%; e.g. less than 3%; such as less than 1%.

Non-organic material may include metals, like steel, iron, silicate, or ceramics.

In an embodiment of the present invention the seal may comprise a Young modulus (or the modulus of elasticity in tension) in the range of 1000-1500 GPa; such as in the range of 1050-1400 GPa; e.g. in the range of 1100-1200 GPa; such as in the range of 1130-1170 GPa; e.g. in the range of 1140-1160 GPa.

If the Young modulus (or the modulus of elasticity in tension) becomes too low, such as below 1000 GPa, it may be difficult to maintain the shape of the seal. If the Young modulus (or the modulus of elasticity in tension) becomes too high, such as above 1500 GPa the desired elasticity of the seal may be lost.

Young modulus (or the modulus of elasticity in tension) may relate to a measure of the ability of a material to withstand changes in length when under lengthwise tension or compression In an embodiment of the present invention the seal may comprise a coefficient of thermal expansion below $20 \times 10^{-5}$ $K^{-1}$; such as $15 \times 10^{-5}$ $K^{-1}$ or below; e.g. below $13 \times 10^{-5}$ $K^{-1}$; such as $11 \times 10^{-5}$ $K^{-1}$ or below; e.g. below $10 \times 10^{-5}$ $K^{-1}$; such as $8 \times 10^{-5}$ $K^{-1}$ or below; e.g. below $6 \times 10^{-5}$ $K^{-1}$; such as in the range of $2 \times 10^{-5}$ $K^{-1}$-$20 \times 10^{-5}$ $K^{-1}$; e.g. in the range of $5 \times 10^{-5}$ $K^{-1}$-$18 \times 10^{-5}$ $K^{-1}$; such as in the range of $5 \times 10^{-5}$ $K^{-1}$-$15 \times 10^{-5}$ $K^{-1}$, e.g. in the range of $10 \times 10^{-5}$ $K^{-1}$-$12 \times 10^{-5}$ $K^{-1}$.

The coefficient of thermal expansion describes how the size of an object changes with a change in temperature. Specifically, it measures the fractional change in size per degree change in temperature at a constant pressure, such that lower coefficients describe lower propensity for change in size.

In an embodiment the seal comprises a moisture absorption less than 1% (w/w); such as less than 0.9% (w/w); e.g. less than 0.8% (w/w); such as less than 0.7% (w/w); e.g. less than 0.6% (w/w); such as less than 0.5% (w/w); e.g. less than 0.4% (w/w); such as less than 0.3% (w/w); e.g. less than 0.2% (w/w); such as less than 0.1% (w/w).

Moisture absorption as used in the present context relates to the capacity of the seal to absorb moisture from its environment. Absorbed moisture has been shown to act as a plasticizer, reducing the glass transition temperature and strength of plastic-which is a reversible effect.

In an embodiment of the present invention the seal comprises a moisture absorption in the range of 0.01-1% (w/w); such as in the range of 0.02-0.9% (w/w); e.g. in the range of 0.03-0.8% (w/w); such as in the range of 0.04-0.7% (w/w); e.g. in the range of 0.05-0.6% (w/w); such as in the range of 0.06-0.5% (w/w); e.g. in the range of 0.07-0.4% (w/w); such as in the range of 0.08-0.3% (w/w); e.g. less than 0.09-0.2% (w/w); such about 0.1% (w/w)]

In a further embodiment of the present invention the seal comprises a max strain of at least 1%; such as at least 2%; e.g. at least 3%; such as at least 4%; e.g. at least 5%.

The max strain of the seal may relate to the maximum stress necessary in order to provide permanent or irreversible deformation of the seal.

In an embodiment of the present invention the seal may, when subjected to a constant stress resulting in a strain of 2%, at 20° C. for at most 6 hours, provide at most 50% extension relative to the stain of 2%, such as at most 30%; such as at most 25%; e.g. at most 20%. Preferably, the seal may within 7 days in relax from the stress applied resume to at most 1% extension relative to the stain of 2%, such as at most 0.75%; such as at most 0.5%; e.g. at most 0.25%.

Correct adjustment of the max stain may significantly influence and improve durability of the seal.

In an embodiment of the present invention the seal may comprise a coefficient of friction (determined against steel) in the range of 0.005-0.4, such as in the range of 0.01-0.3; e.g. in the range of 0.05-0.25; such as in the range of 0.075-0.2; e.g. in the range of 0.09-0.19.

Preferably, the seal comprises a coefficient of friction (determined against steel) which is below 0.4, such as below 0.3; e.g. below 0.25; such as below 0.2; e.g. below 0.19.

In the context of the present invention the term "coefficient of friction" depends on the material against which the friction may be created. Preferably, the "coefficient of friction" according to the present invention may be determined as the material against steel.

The coefficient of friction may be defined by the friction between the seal (3d) and a shaft (preferably a shaft of steel) when inserted into the bearing housing. The coefficient of friction may be the ratio defining the force that resists the motion of one body in relation to another body in contact with it. This ratio may be dependent on material properties and may have a value between 0 and 1.

In an embodiment of the present invention each of the two or more bearing housing feet may comprise a sealing between each of the two or more bearing housing feet and the base.

The bearing housing may be made of a plastic material or a metal material or a combination hereof. The plastic material may be selected from a polypropylene material. Preferably, the polypropylene material may be a sturdy polypropylene material. The metal material may be stainless steel.

In an embodiment of the present invention all exposed surfaces of the bearing housing may have a smooth finish such that dirt, grime, microbial material (such as bacteria or fungus), or other fouling materials, such as allergens, may be cleaned from the surface. Preferably, the bearing housing according to the present invention may be free of joints, pits, folds, cracks, crevices, and other imperfections in the final fabricated form, when installed on the machinery and/or when working within the specified load conditions.

Preferably, none of the exposed surfaces of the bearing housing according to the present invention comprising knurled surfaces.

All the exposed surfaces of the bearing housing according to the present invention may preferably be cleanable.

All the exposed surfaces of the bearing housing according to the present invention may preferably be inspectable.

In the context of the present invention the terms "surface" and "exposed surface" may be used interchangeably and relates to any surface that may be accessible to dirt, grime, microbial material (such as bacteria or fungus), or other fouling materials, such as allergens.

In an embodiment of the present invention all the exposed surfaces of the bearing housing according to the present invention may be self-draining. I a further embodiment of the present invention the bearing housing comprises no surfaces which has one or more pockets which may retain liquids.

In the context of the present invention, the term "self-draining" relates to a surface constructed, designed and/or fabricated in a manner allowing aqueous suspension, such as aqueous cleaning suspension, like water, to escape and/or leaving the surface.

In a preferred embodiment cleaning of the bearing housing may be by manual cleaning. During manual cleaning, removal of dirt, grime, microbial material, or other fouling materials may be affected by an aqueous suspension, e.g. chemical and/or water rinses, optionally with the assistance of one or a combination of brushes, nonmetallic scouring pads and scrapers. Rinses may be performed by high- or low-pressure hoses, and/or with cleaning aids manipulated by hand.

In order to limit accumulation and/or growth of dirt, grime, microbial material or other fouling materials on the exposed surfaces of the bearing housing and to improve drainage of aqueous suspension, e.g. water, from the surface, the surface of the bearing housing may be a smooth surface.

In an embodiment of the present invention the surface of the bearing housing may be smooth. Preferably, the smooth surface of the bearing housing may allow drainage, preferably self-drainage, of liquids from the surface.

Smoothness of the exposed surface of the bearing housing according to the present invention may be determined by the "Roughness Average (Ra)". Roughness Average or Ra is an arithmetical mean of the absolute values of the surface profile departure within a sampling length. In the context of the present invention the roughness (Ra) of the surface of the bearing housing may be determined according to the ISO 4287:1997 standard.

Preferably the surface of the bearing housing according to the present invention may comprise all the exposed surfaces of the bearing housing.

The surface of the bearing housing may have a roughness below Ra 2.0 µm; such as Ra 1.8 µm; e.g. Ra 1.6 µm; such as Ra 1.4 µm; e.g. Ra 1.2 µm; such as Ra 1.0 µm; e.g. Ra 0.8 µm; such as Ra 0.6 µm; e.g. Ra 0.4 µm.

Preferably, the bearing housing according to the present invention comprises no exposed surfaces; ledges and/or edges which are horizontal.

In an embodiment of the present invention the bearing housing all exposed surfaces; ledges and/or edges are curvilinear or curved.

In order to ensure high drainage effect at least one of the exposed surfaces; ledges and/or edges of the bearing housing, preferably all exposed surfaces; ledges and/or edges, may have an angle, may be founded or has a curvature relative to horizontal.

In an embodiment the present invention at least one of the exposed surfaces; ledges and/or edges of the bearing housing, preferably all exposed surfaces; ledges and/or edges, may have a radius of 1 mm or above improving water runoff from at least one of the exposed surfaces, preferably all the exposed surfaces; ledges and/or edges of the bearing housing; such as a radius of 2 mm or above; e.g. a radius of as 3 mm or above, such as a radius of 3.2 mm or above; e.g. a radius of 3.5 mm or above; such as a radius of 4 mm or above, e.g. 5 mm or above.

Preferably the bearing housing comprises no exposed surfaces; ledges and/or edges having a radius below 3.2 mm; such as below 3 mm; e.g. below 2.5 mm; such as below 1 mm; e.g. below 0.8 mm.

In an embodiment of the present invention all the exposed surfaces; ledges and/or edges of the bearing housing may have an angle, may be founded or has a curvature of at least 3 degree relative to horizontal; e.g. 3.2 degree or above relative to horizontal, such as 3.5 degree or above relative to horizontal; e.g. 3.75 degree or above relative to horizontal; such as 4 degree or above relative to horizontal, e.g. 5 degree or above relative to horizontal.

In an embodiment of the present invention the exposed surfaces, ledges and/or edges of the bearing housing may be constructed, designed and/or fabricated in accordance with national standards and/or directives, like one or more of:

EN 1672-2:2005 Food machinery/General design principles/Part 2: Hygiene requirements.

EN ISO 14 159 2004 Safety of machinery-Hygiene requirements for the design of machinery.

Document 13 EHEDG guideline on the hygienic design of apparatus for open processes.

EHEDG Class I: The hygienic design criteria evaluation report concludes that the designs meet the criteria for hygienic equipment class I for components situated in the non-food area and are accessible for easy cleaning without dismantling.

3-A sanitary standard for machine levelling feet and supports.

USDA Guidelines for the sanitary design and fabrication of dairy processing equipment June 2001 and/or national regulations, such as one or more of:

852/2004 on the hygiene of foodstuffs.

853/2004 specific hygiene rules for food of animal origin.

854/2004 specific rules for the organization of official controls on products of animal origin intended for human consumption.

1935/2004 on materials and articles intended to come into contact with food.

The bearing housing according to the present invention may be provided with a bearing. A bearing according to the present invention may be a machine element that constrains relative motion to only the desired motion, and reduces friction between moving parts, e.g. a shaft, relative to a non-moving parts, e.g. the bearing housing. Preferably the bearing housing may comprise a bearing suitable for receiving a rotating shaft.

In an embodiment of the present invention the bearing may be a ceramic bearing or a stainless steel bearing. Preferably, the bearing may be a ceramic bearing.

In an embodiment of the present invention the beating may be a fat free and/or a lubricant free bearing. Due to the construction, design and fabrication of the bearing housing and the reduced number of elements joint and protected by a sealing ensure a waterproof bearing housing, preferably a long-term waterproof property, the bearing housing according to the present invention.

In an embodiment of the present invention the bearing housing consist essentially of a bearing housing body having two or more bearing housing feet (preferably between 2 and 4 bearing housing feet) extending from the bearing housing body by means of an arm, a joint (and a sealing) between the bearing housing body and a removable flat cover; a joint (and a sealing) between the bearing housing body and a removable bearing housing cover; a joint (and a sealing) between each of the bearing housing feet of the bearing housing body and the base; and a joint (and a sealing) between each of the bearing housing feet of the bearing housing body and each of the bolts used to attach the bearing housing to the base.

In a preferred embodiment of the present invention the bearing housing may be a hygienic bearing housing.

In the context of the present invention the term "hygienic bearing housing" relates to a bearing housing adapted for reducing or preventing dirt, grime, microbial material, or other kind of fouling to access gap; joints; pits; folds; cracks; crevices; or other imperfections, in or between connecting surfaces or elements.

In a preferred embodiment of the present invention the bearing housing according to the present invention may be used in environments with high hygienic requirements, high cleaning requirements and/or environments where low (or no) deposit or accumulation of dirt, grime, microbial material and/or allergens may be accepted.

A further preferred embodiment relates to the use of the bearing housing according to the present invention for use in food production industry, feed production industry, and/or pharmaceutical industry.

In an embodiment of the present invention the bearing housing according to the present invention may be provided with a built-in sensor. Preferably, the built-in sensor may transmit data, such as operating data or construction data to a mobile device and/or to a cloud surveillance of the bearing housing.

By introducing such sensor into the bearing housing according to the present invention a safer operation, a more efficient operation, an improved maintenance and/or a reduced downtime of the machinery may be provided.

In an embodiment of the present invention the sensor is implemented into the removable bearing housing cover.

In an embodiment of the present invention the sensor may be configures to monitor one or more of vibrations, temperature, leakage, moisture, exterior cleaning and/or location of the bearing housing.

It should be noted that embodiments and features described in the context of one of the aspects of the present invention also apply to the other aspects of the invention.

The invention claimed is:

1. A bearing housing (1) comprising:
   a bearing housing body (2) for receiving a rotating shaft, and two or more bearing housing feet (4) for attaching the bearing housing (1) to a base (10),
   wherein each of said two or more bearing housing feet (4) extends from the bearing housing body (2) by an arm (6), and wherein the bearing housing body (2) and the arms (6) are not in contact with the base (10) when the bearing housing is in an operational state and a seal (3*a*) is provided at a base end of each of the bearing housing feet (4*b*) facing the base (10),
   wherein the bearing housing body (2) comprises a fixed bearing housing body (2*a*), a bearing housing cover (2*b*) and a flat cover (2*c*) comprising an opening for inserting the shaft (11), which opening is closed by the shaft (11) when the bearing housing is in an operational state,
   wherein parts of the bearing housing body (2) with the shaft (11) inserted form a closed space, and at least one of the bearing housing cover (2*b*) or the flat cover (2*c*) is removable,
   and wherein a seal (3*c*, 3*b*) is positioned between respectively the fixed bearing housing body (2*a*) and the removable flat cover (2*c*) and between the fixed bearing housing body and the removable bearing housing cover (2*b*).

2. The bearing housing (1) according to claim 1, wherein the arm (6) is formed as a polyhedron comprising a tip (8).

3. The bearing housing (1) according to claim 2, wherein the tip (8) of the polyhedron points towards the base (10).

4. The bearing housing (1) according to claim 2, wherein the arm (6) is formed as a triangular prism, a square prism, a pentagonal prism, or a hexagonal prism.

5. The bearing housing (1) according to claim 2, wherein the arm (6) is formed as a triangular prism.

6. The bearing housing (1) according to claim 1, wherein said two or more bearing housing feet (4) are the only part of the bearing housing (1) which is in contact with the base (10).

7. The bearing housing (1) according to claim 1, wherein the length of said two or more bearing housing feet (4) is in the direction substantially longitudinal to the opening for receiving the rotating shaft and/or substantially perpendicular to the base (10) where the bearing housing (1) is mounted.

8. The bearing housing (1) according to claim 1, wherein the bearing housing (1) is made of a plastic material.

9. The bearing housing (1) according to claim 8, wherein the plastic material is selected from a polypropylene material.

10. The bearing housing (1) according to claim 1, wherein the fixed bearing housing body (2*a*) is connected to each of said two or more bearing housing feet (4) via respective ones of the arms (6).

11. The bearing housing (1) according to claim 1, wherein the seals are configured with contours adapted to the structure of adjacent surfaces thereby ensuring a continuous or substantially continuous surface in the joints between the adjacent surfaces.

12. The bearing housing (1) according to claim 1, wherein the seals are prepared from a non-conductive silicone material.

13. A bearing housing (1) comprising:
   a bearing housing body (2) for receiving a rotating shaft, and two or more bearing housing feet (4) for attaching the bearing housing (1) to a base (10), wherein each of said two or more bearing housing feet (4) extends from the bearing housing body (2) by an arm (6), wherein the bearing housing body (2) comprises a fixed bearing housing body (2a), a bearing housing cover (2b) and a flat cover (2c) comprising an opening for inserting the shaft (11), wherein parts of the bearing housing body (2) with the shaft (11) inserted form a closed space, and at least one of the bearing housing cover (2b) or the flat cover (2c) is removable, and wherein a seal (3c, 3b) is positioned between respectively the fixed bearing housing body (2a) and the removable flat cover (2c) and between the fixed bearing housing body and the removable bearing housing cover (2b).

14. The bearing housing (1) according to claim 13, wherein the seals (3b, 3c) are configured with contours adapted to the structure of adjacent surfaces thereby ensuring a continuous or substantially continuous surface in the joints between the adjacent surfaces.

15. The bearing housing (1) according to claim 13, wherein the seals (3b, 3c) are prepared from a non-conductive silicone material.

16. A bearing housing (1) comprising:

a bearing housing body (2) for receiving a rotating shaft, and two or more bearing housing feet (4) for attaching the bearing housing (1) to a base (10), wherein each of said two or more bearing housing feet (4) extends from the bearing housing body (2) by an arm (6), and wherein the bearing housing body (2) and the arms (6) are not in contact with the base (10) when the bearing housing is in an operational state and a seal (3a) is provided at a base end of each of the bearing housing feet (4b) facing the base (10), wherein the bearing housing body (2) comprises a fixed bearing housing body (2a), a bearing housing cover (2b) and a flat cover (2c) comprising an opening for inserting the shaft (11), which opening is closed by the shaft (11) when the bearing housing is in an operational state, wherein parts of the bearing housing body (2) with the shaft (11) inserted form a closed space, and at least one of the bearing housing cover (2b) or the flat cover (2c) is removable, and wherein the arm (6) is formed as a polyhedron comprising a tip (8) and the tip (8) of the polyhedron points towards the base (10).

* * * * *